(12) United States Patent
Van Bommel et al.

(10) Patent No.: US 10,416,369 B2
(45) Date of Patent: Sep. 17, 2019

(54) LIGHT CONCENTRATOR FOR USE IN A LIGHTING DEVICE

(71) Applicant: SIGNIFY HOLDING B.V., Eindhoven (NL)

(72) Inventors: Ties Van Bommel, Eindhoven (NL); Rifat Ata Mustafa Hikmet, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 64 days.

(21) Appl. No.: 15/516,011

(22) PCT Filed: Sep. 28, 2015

(86) PCT No.: PCT/EP2015/072252
§ 371 (c)(1),
(2) Date: Mar. 30, 2017

(87) PCT Pub. No.: WO2016/050687
PCT Pub. Date: Apr. 7, 2016

(65) Prior Publication Data
US 2017/0293066 A1  Oct. 12, 2017

(30) Foreign Application Priority Data

Oct. 3, 2014 (EP) .................................. 14187664

(51) Int. Cl.
*F21V 8/00* (2006.01)
*F21K 9/61* (2016.01)
(Continued)

(52) U.S. Cl.
CPC .............. *G02B 6/0026* (2013.01); *F21K 9/61* (2016.08); *F21K 9/64* (2016.08); *F21K 9/68* (2016.08);
(Continued)

(58) Field of Classification Search
CPC .. G02B 6/0026; G02B 6/0076; G02B 6/0096; F21K 9/61; F21K 9/64; F21K 9/68; F21K 9/69; F21Y 2115/10
(Continued)

(56) References Cited

U.S. PATENT DOCUMENTS 8,247,831 B2    8/2012 Jagt
2010/0283914 A1  11/2010 Hamada
(Continued)

FOREIGN PATENT DOCUMENTS

JP    2008530766 A    8/2008
JP    2014143344 A    8/2014
(Continued)

*Primary Examiner* — Anh T Mai
*Assistant Examiner* — Jessica M Apenteng
(74) *Attorney, Agent, or Firm* — Akarsh P. Belagodu

(57) ABSTRACT

A light concentrator (11) is disclosed which comprises at least one lighting element (1) configured to emit light (32), an optical filter (3) arranged so as to receive light having a wavelength within a selected wavelength emission band via a light in-coupling surface (4) and configured to selectively transmit light incident on the light in-coupling surface through the optical filter and output the light via a light out-coupling surface (5), on a condition that the light incident on the light in-coupling surface has a wavelength within a selected wavelength transmission band, a light-redirection element (6) having a light-redirection surface (7) arranged substantially parallel in relation to the light out-coupling surface (5) of the optical filter so as to receive at least some of the light out-coupled via the light out-coupling surface (5), and configured to redirect light impinging on the light-redirection surface, and a light-guiding region (8), which is delimited at least by the light-redirection surface and the light out-coupling surface (5) of the optical filter, for guiding light out-coupled via the light out-coupling surface towards at least one light-exiting region (9) arranged sub-
(Continued)

stantially perpendicular to the light out-coupling surface (5) via which light may leave the light concentrator. The optical filter (3) is configured such that characteristics of the wavelength transmission band depend at least in part on the angle of incidence of light incident on the light in-coupling surface (4), and wherein the optical filter (3) is configured such that the wavelength transmission band for a selected angle or angles of incidence of light incident on the light in-coupling surface (4) at least in part overlaps with the wavelength emission band, whereby light incident on the light in-coupling surface (4) with an angle of incidence equal to or within the selected angle or angles of incidence of light is transmitted through the optical filter (3).

13 Claims, 5 Drawing Sheets

(51) Int. Cl.
    *F21K 9/64*     (2016.01)
    *F21K 9/68*     (2016.01)
    *F21K 9/69*     (2016.01)
    *F21Y 115/10*     (2016.01)

(52) U.S. Cl.
    CPC .............. *F21K 9/69* (2016.08); *G02B 6/0076* (2013.01); *F21Y 2115/10* (2016.08); *G02B 6/0096* (2013.01)

(58) Field of Classification Search
    USPC ........................................................ 362/297
    See application file for complete search history.

(56) References Cited

U.S. PATENT DOCUMENTS

2010/0314646 A1   12/2010   Breen et al.
2014/0092580 A1    4/2014   McCollum et al.

FOREIGN PATENT DOCUMENTS

| WO | WO199946879 A1 | 9/1999 |
| WO | WO2011024104 A2 | 3/2011 |
| WO | WO2014030100 A1 | 2/2014 |
| WO | WO2014155250 A1 | 10/2014 |

US 10,416,369 B2

LIGHT CONCENTRATOR FOR USE IN A LIGHTING DEVICE

CROSS-REFERENCE TO PRIOR APPLICATIONS

This application is the U.S. National Phase application under 35 U.S.C. § 371 of International Application No. PCT/EP2015/072252, filed on Sep. 28, 2015, which claims the benefit of European Patent Application No. 14187664.9, filed on Oct. 3, 2014. These applications are hereby incorporated by reference herein.

TECHNICAL FIELD

The present invention generally relates to the field of lighting equipment and devices. Specifically, the present invention relates to a light concentrator for use in a lighting device, and a lighting device comprising the light concentrator.

BACKGROUND

Light sources, e.g. light fittings, light fixtures or luminaires, capable of emitting light having a relatively high brightness and/or intensity, are relevant in various applications. Such applications may include, but are not limited to, spot lighting, stage lighting, headlamps and digital light projection. Various ways for increasing the brightness and/or intensity of light emitted by light sources are known in the art. For example, a plurality of light-emitting elements such as light-emitting diodes (LEDs) may be arranged in a light mixing box with a relatively small opening, or blue light generated by means of a so called sapphire rod. However, there is still a need in the art for improved or alternative ways for realizing light sources capable of providing light having a relatively high brightness and/or intensity.

SUMMARY

In view of the above, a concern of the present invention is to provide a light source capable of emitting light having a relatively high brightness and/or intensity.

To address at least one of this concern and other concerns, a light concentrator and a lighting device in accordance with the independent claims are provided. Preferred embodiments are defined by the dependent claims.

According to a first aspect, there is provided a light concentrator which comprises at least one lighting element configured to emit light. The light concentrator comprises an optical filter, or optical element, arranged so as to receive light having a wavelength within a selected wavelength emission band via a light in-coupling surface and configured to selectively transmit light incident on the light in-coupling surface through the optical filter and output the light via a light out-coupling surface, on a condition that the light incident on the light in-coupling surface has a wavelength within a selected wavelength transmission band. The optical filter is configured such that characteristics of the wavelength transmission band depend at least in part on the angle of incidence of light incident on the light in-coupling surface. The optical filter is configured such that the wavelength transmission band for a selected angle or angles of incidence of light incident on the light in-coupling surface at least in part overlaps with the wavelength emission band, whereby light incident on the light in-coupling surface with an angle of incidence equal to or within selected angle or angles of incidence of light is transmitted through the optical filter.

The light concentrator further comprises a light-redirection element which has a light-redirection surface that is arranged substantially parallel in relation to the light out-coupling surface of the optical filter so as to receive at least some of the light out-coupled via the light out-coupling surface of the optical filter. The light-redirection surface is configured to redirect light impinging on the light-redirection surface. The light concentrator further comprises a light-guiding region, which is delimited at least by the light-redirection surface and the light out-coupling surface, and which is for guiding light out-coupled via the light out-coupling surface of the optical filter towards at least one light-exiting region arranged substantially perpendicular to the light out-coupling surface and via which light may leave the light concentrator.

According to an example, the light concentrator may comprise a wavelength-selective element arranged so as to receive at least a portion of light having been emitted by the at least one lighting element and configured to, responsive thereto, output light having a wavelength within the selected wavelength band, wherein the optical filter is arranged so as to receive at least a portion of light having been output by the wavelength-selective element. As will be further described in the following, the wavelength-selective element may for example comprise luminescent material, phosphors, or any other material or element configured to or capable of emitting light having a wavelength within a relatively narrow wavelength transmission band, or being characterized by relatively narrow emission characteristics.

The optical filter includes or is constituted by an optical element for which characteristics of its wavelength transmission band at least in part depend on the angle of incidence of light incident on the optical element. Such characteristics may for example be realized by means of the optical filter comprising or being constituted by a multilayer reflector and/or a dichroic reflector.

Principles of embodiments of the present invention make use of a combination of at least one lighting element, possibly in combination with a wavelength-selective element such as mentioned above, and an optical filter such as mentioned above, in a way such that the wavelength transmission band of the optical filter is matched to the wavelength emission band of the at least one lighting element, or possibly the wavelength-selective element (e.g. so that there is complete or partial overlap between the wavelength transmission band and the wavelength emission band, or vice versa), such that essentially only light having a certain angle of incidence or being within a certain angle of incidence interval is transmitted through the optical filter. In that way, light transmitted from the optical filter may be essentially only within a certain angular range, e.g. with respect to a normal vector of the optical filter's light out-coupling surface. Thereby, a relatively high degree of collimation of a beam of light output from the optical filter, or a relatively high uniformity of directionality of a light field output from the optical filter, may be achieved. For example, collimated light output from the optical filter may be reflected from the light-redirection surface which alters the direction of the collimated light such that it may be guided or conveyed within the light-guiding region towards the at least one light-exiting region, where it may leave the light concentrator. Thereby, a relatively high intensity of light leaving the light concentrator may be achieved, possibly while preserving or substantially preserving the etendue at the at least one light-exiting region with respect to the light output from the optical filter.

The at least one lighting element may be configured to emit light having a narrow spectral peak with a full width at half maximum of less than about 30 nm, or less than about 20 nm, or less than about 10 nm, or less than about 5 nm. A configuration of the at least one lighting element so that it is configured to emit light having a full width at half maximum of less than about 30 nm, or less than about 20 nm, or less than about 10 nm, may be particularly useful in case the wavelength-selective element is omitted. The at least one lighting element may for example include or be constituted by a solid state light emitter. Examples of solid state light emitters include inorganic light-emitting diodes (LEDs), organic LEDs (OLEDs), and laser (diodes).

The light concentrator may comprise a plurality of lighting elements. When a plurality of lighting elements is employed, the lighting elements may be 'binned' so that the spectral light peaks overlap. The distance between the maximum intensities of the spectral light peaks of the lighting elements is preferably not greater than about 10 nm, or not greater than about 5 nm, or not greater than about 2 nm.

According to an example, the wavelength-selective element may be configured such that light output by the wavelength-selective element has a full width at half maximum of less than about 30 nm, or less than about 20 nm, or less than about 10 nm, or less than about 5 nm. As mentioned above, the wavelength-selective element may for example comprise luminescent material, phosphors, or any other material or element configured to or capable of emitting light having a wavelength within a relatively narrow wavelength transmission band, or being characterized by relatively narrow emission characteristics.

It is to be understood that there may possibly be intermediate component(s) arranged between the at least one lighting element and the wavelength-selective element, and/or between the wavelength-selective element and the optical filter, or between the at least one lighting element and the optical filter. Such an intermediate component may for example comprise some intermediate optical coupling or connection means or the like. Hence, the at least one lighting element and the wavelength-selective element may be arranged relatively to each other such that the wavelength-selective element directly or indirectly may receive at least a portion of light having been emitted by the at least one lighting element. The wavelength-selective element and the optical filter may be arranged relatively to each other such that the optical filter directly or indirectly may receive at least a portion of light having been output by the wavelength-selective element. The at least one lighting element and the optical filter may be arranged relatively to each other such that the optical filter directly or indirectly may receive at least a portion of light having been output by the at least one lighting element.

As indicated in the foregoing, the optical filter may for example comprise a multilayer reflector and/or a dichroic reflector.

The optical filter may in principle have any shape. Depending on the shape of the other components of the light concentrator, such as the light-redirection element, a shape of the optical filter may for example be a planar shape, which may facilitate achieving a relatively flat light concentrator or light-emitting device.

As indicated in the foregoing, the wavelength-selective element may for example comprise luminescent material, which may be configured to absorb the at least a portion of light emitted by the at least one lighting element, and responsive thereto (i.e. responsive to receiving or absorbing light) output or emit light having a wavelength within the selected wavelength emission band. The outputted light preferably has a full width at half maximum of less than about 30 nm, or less than about 20 nm, or less than about 10 nm, or less than about 5 nm. The luminescent material may for example comprise at least one element selected from the group of quantum confinement structures, lanthanide complexes, rare earth metal elements and so called phosphors.

The optical filter may be configured such that the wavelength transmission band for a selected angle or angles of incidence of light incident on the light in-coupling surface at least in part overlaps with the wavelength emission band, whereby light incident on the light in-coupling surface with an angle of incidence equal to or within the selected angle or angles of incidence of light may be transmitted through the optical filter, such that light output via the light out-coupling surface is output at an angle with respect to a direction perpendicular to the light out-coupling surface. Thus, the optical filter may be tuned or configured such that light is output from the light out-coupling surface non-perpendicularly with respect to the light out-coupling surface, or non-parallel with the direction perpendicular to the light out-coupling surface.

According to an example, the wavelength-selective element may comprise a plurality of wavelength-selective portions which are arranged so as to receive at least a portion of light emitted by the at least one lighting element and configured to, responsive thereto, output light having a wavelength within a selected, respective wavelength emission band.

The optical filter may comprise a plurality of portions. Each portion of the optical filter may correspond to a wavelength-selective portion. Each portion of the optical filter may arranged so as to receive at least a portion of light output by a wavelength-selective portion via a light in-coupling surface and configured to selectively transmit light incident on the light in-coupling surface through the optical filter and output the light via a light out-coupling surface, on a condition that the light incident on the light in-coupling surface has a wavelength within a selected, respective wavelength transmission band.

The light concentrator may comprise a plurality of wavelength-selective elements and a plurality of optical filters. Each of the plurality of optical filters may correspond to one of the plurality of wavelength-selective elements, or vice versa.

Each of the plurality of optical filters and the corresponding one of the plurality of wavelength-selective elements may be arranged and configured so as to operate in conjunction with each other, e.g. such as described above with respect to the first aspect.

Hence, the light concentrator may comprise multiple setups of wavelength-selective element-optical filter pairs.

The light concentrator may comprise a plurality of lighting elements, which each may be configured to or capable of emitting light, possibly independently of each other.

The light-redirection surface is parallel or substantially parallel with the light out-coupling surface. By substantially parallel is meant that an angle between the light-redirection surface and the light out-coupling surface is relatively small such as in a range between 0 degrees and 20 degrees, or in a range between 0 degrees and 10 degrees. The light-redirection surface may according to an example be arranged at an angle to the light out-coupling surface wherein the angle may for example be 20 degrees or less. By arranging the light-redirection surface at an angle with respect to the light out-coupling surface, or vice versa, propagating, guiding or conveying light guided in the light-guiding region to the at least one light-exiting region may be facilitated or even enabled.

The light-redirection element may for example comprise a reflective light-scattering element. The light-redirection element may in alternative or in addition according to an example comprise luminescent material. The luminescent material which may be comprised in the light-redirection element may for example be selected from one or more elements in the group of quantum confinement structures, lanthanide complexes, rare earth metal elements and phosphors. The light-redirection element may according to an example in alternative or in addition comprise a diffractive element. According to another example, the light-redirection element may in alternative or in addition comprise a refractive element. The refractive element and/or the diffractive element may be coupled or connected to (directly or indirectly, e.g. via some intermediate optical coupling means) a specularly reflective element. The refractive element and/or the diffractive element may arranged so as to receive at least some of the light out-coupled via the light out-coupling surface.

The light-redirection element may in principle have any shape. Depending on the shape of the other components of the light concentrator, such as the optical filter, a shape of the light-redirection element may for example be a planar shape, for facilitating achieving a relatively flat light concentrator or light-emitting device. The light-redirection surface and/or the light out-coupling surface may be flat, or substantially flat.

As mentioned in the foregoing, the light concentrator may comprise a plurality of wavelength-selective elements and a plurality of optical filters, where each of the plurality of optical filters may correspond to one of the plurality of wavelength-selective elements, and each of the plurality of optical filters and the corresponding one of the plurality of wavelength-selective elements may be arranged and configured so as to operate in conjunction with each other e.g. such as described above with reference to the first aspect.

According to an example, the light concentrator may comprise a plurality of light-redirection elements. Each of the plurality of light-redirection elements may correspond to one of the plurality of optical filters. Each of the plurality of light-redirection elements may have a light-redirection surface which is arranged in relation to the light out-coupling surface of the corresponding optical filter so as to receive at least some of the light out-coupled via the light out-coupling surface of the corresponding optical filter, and configured to redirect light impinging on the light-redirection surface.

The light concentrator may comprise a plurality of light-guiding regions, each of which may be delimited at least by one of the plurality of light-redirection surfaces and the corresponding light out-coupling surface, for guiding light out-coupled via the light out-coupling surface towards at least one light-exiting region via which light may leave the light concentrator.

Hence, the light concentrator may include several light-guiding regions, from each of which there may be realized or achieved a relatively high intensity of light leaving the light concentrator, possibly while preserving or substantially preserving the etendue at the light-exiting region with respect to the light output from the respective optical filters.

In the context of the present application, by the term light concentrator it is generally meant a structure, assembly or arrangement which collects or receives light and (at least) spatially (re-)distributes light such that the light intensity is concentrated, or increased, at a desirable location in space from which light may leave the light concentrator.

The light-guiding region may be substantially transparent to wavelengths of light expected to be output from the optical filter. The light-guiding region may include or be constituted by open void(s), filled with any gas, such as air, or substantially vacuum. The light-guiding region may include or be constituted by a solid material.

The light-guiding region may for example include a light guide, which in the context of the present application should be understood as a structure arranged to enable propagation of light coupled into it, or convey or guide light coupled into it, for example along a direction in which the light guide extends. Light may for example be guided or conveyed within the light guide by means of undergoing multiple reflections within the light guide, such as, for example, by means of multiple reflections at an interface between the light guide and its exterior, via so called total internal reflection (TIR).

The light guide may comprise a material through which light can propagate. The material may at least in part include a transparent material, which allows light to pass through the material without being scattered. The light guide may include material selected from the group including poly (methylmethacrylate) (PMMA) (sometimes referred to as acrylic glass), polycarbonate, glass, silicone and/or silicone rubber. The light guide may have various forms, such as a plate, a rod or a fiber. The shape of the light guide may be substantially regular or irregular. The light guide may have a rectangular, triangular or circular shape or may have any other substantially regular or irregular shape. The light guide may comprise the at least one light-exiting region.

The at least one light-exiting region may comprise an opening or aperture via which light may leave the light concentrator. As discussed in the foregoing, the at least one light-exiting region may be arranged in a light guide. In the context of the present application the term light-exiting region encompasses a 'planar region', e.g. a surface or a plate-like or disk-like region, which may include a surface of the light guide at an interface between the light guide and its exterior.

According to a second aspect, there is provided a lighting device which comprises at least one light concentrator according to the first aspect.

In the context of the present application, by the term lighting device it is meant a device or a system arranged and/or configured so as to provide and possibly generate light. The lighting device may according to embodiments of the present invention include or be constituted by a lighting fixture or lighting fitting, a light engine, a lamp or a luminaire, which may comprise wiring and electronics arranged to connect and power any light source(s) connected to or included in the lighting device.

It is contemplated that the lighting device may have applications in, e.g., digital projection, automotive lighting, entertainment lighting, stage lighting, shop lighting, home lighting, accent lighting, spot lighting, theater lighting, fiber optic lighting, display systems, warning lighting systems, healthcare and/or medical lighting applications, microscopy lighting, lighting for analytical equipment, or decorative lighting applications.

Optionally, the light concentrator according to the first aspect and/or the lighting device according to the second aspect may utilize or be combined with a beam shaping element that receives and modifies light output by the light concentrator or lighting device, respectively, so as to attain in principle any desired or required beam shape, collimation and or form for use in various applications such as mentioned above.

The at least one lighting element may for example include or be constituted by a solid state light emitter. Examples of solid state light emitters include light-emitting diodes (LEDs), organic LEDs (OLEDs), and laser diodes. Solid state light emitters are relatively cost efficient light sources since they in general are relatively inexpensive and have a relatively high optical efficiency and a relatively long lifetime.

However, in the context of the present application, the term "lighting element" should be understood to mean substantially any device or element that is configured to or capable of emitting radiation in any region or combination of regions of the electromagnetic spectrum, for example the visible region, the infrared region, and/or the ultraviolet region, when activated e.g. by applying a potential difference across it or passing a current through it. Therefore a lighting element can have monochromatic, quasi-monochromatic, polychromatic or broadband spectral emission characteristics. Examples of lighting elements include semiconductor, organic, or polymer/polymeric LEDs, violet LEDs, blue LEDs, optically pumped phosphor coated LEDs, optically pumped nano-crystal LEDs or any other similar devices as would be readily understood by a person skilled in the art. Furthermore, the term lighting element can be used to define a combination of the specific lighting element which emits the radiation in combination with a housing or package within which the specific lighting element or lighting elements are positioned or arranged. For example, the term lighting element may comprise a bare LED die arranged in a housing, which may be referred to as a LED package.

In the context of the present application, by the term wavelength emission band it is meant a wavelength band, or wavelength range, within which emission of light from or by an element may occur. The band or range does not necessarily have to be a consecutive band or range, but may include or be constituted by a plurality of non-consecutive sub-bands or sub-ranges.

In the context of the present application, by the term wavelength transmission band it is meant a wavelength band, or wavelength range, within which transmission light impinging on an element through the element may occur. The band or range does not necessarily have to be a consecutive band or range, but may include or be constituted by a plurality of non-consecutive sub-bands or sub-ranges.

In the context of the present application, by the term quantum confinement structures it is meant elements such as, but not limited to, quantum wells, quantum dots, quantum rods, or nano-wires. A quantum well is a potential well with only discrete energy values and may be formed in semiconductors by having a material, like gallium arsenide or indium gallium nitride sandwiched between two layers of a material with a wider band gap, like aluminum arsenide or gallium nitride. Quantum dots (or rods, or nano-wires) are small crystals of semiconducting material generally having a size, e.g. width, radius or diameter, of only a few nanometers. When excited by incident light, a quantum dot may emit light of a color determined by the size and material of the crystal. Light of a particular color may therefore be produced for example by adapting the size and/or material of the quantum dots. Most known quantum dots with emission in the visible range of the electromagnetic spectrum are based on cadmium selenide (CdSe) with a shell (or shells) such as cadmium sulfide (CdS) and zinc sulfide (ZnS). Cadmium free quantum dots such as indium phosphide (InP), and copper indium sulfide ($CuInS_2$) and/or silver indium sulfide ($AgInS_2$) can also be used. Quantum dots generally have relatively narrow emission band and can hence provide saturated colors. Furthermore the color of emitted light can be tuned by adapting the size and/or dimension of the quantum dots.

Any type of quantum confinement structure may be used in conjunction with embodiments of the present invention, provided that the quantum confinement structures have the appropriate wavelength conversion or emission characteristics. However, it may be preferred for reasons of environmental safety and concern to use cadmium-free quantum confinement structures or at least quantum confinement structures having relatively low cadmium content.

Cadmium-containing quantum dots may emit light having a spectral peak up to 15 or 20 nanometers (FWHM). Cadmium-free quantum dots may emit light having a spectral peak up to 25 or 30 nanometers (FWHM). An example of a rare earth metal complex being a narrowband light emitting luminescent material is, for example, a lanthanide complex such as $Eu_2(dbt)_3.4H_2O$ which has a spectral peak of approximately 5 nanometer (FWHM).

Luminescent material used in conjunction with embodiments of the present invention may for example comprise any one of the materials from a group comprising quantum dots, quantum rods, quantum tetrapods, nano-crystals, rare earth metal complexes and phosphors, which may be characterized by relatively narrow spectral emission characteristics.

In the context of the present application, luminescent material is to be understood as a material, element or substance which exhibits or realizes light emission in response to having been excited by means of luminescence.

The wavelength-selective element may include or be constituted by a wavelength converting member or wavelength converting material, e.g. comprising a luminescent material configured to or capable of converting light within a first wavelength range into light within a second wavelength range, possibly with the second wavelength range being Stokes-shifted with respect to the first wavelength range. In alternative or in addition, the wavelength converting material or member may be configured so as to exhibit or realize light emission in response to a fluorescence and/or phosphorescence process.

In the context of the present application, by a 'light field' it is meant a collection and/or bundle of light rays in space, each of which light rays has a starting point, direction, intensity, and spectral power distribution.

In the context of the present application, by uniformity of directionality it is meant a similarity of the directions of the individual light rays in the collection of light rays in the light field.

Further objects and advantages of the present invention are described in the following by means of exemplifying embodiments.

It is noted that the present invention relates to all possible combinations of features recited in the claims. Further features of, and advantages with, the present invention will become apparent when studying the appended claims and the description herein. Those skilled in the art realize that different features of the present invention can be combined to create embodiments other than those described herein.

BRIEF DESCRIPTION OF THE DRAWINGS

Exemplifying embodiments of the invention will be described below with reference to the accompanying drawings.

Figure 1:
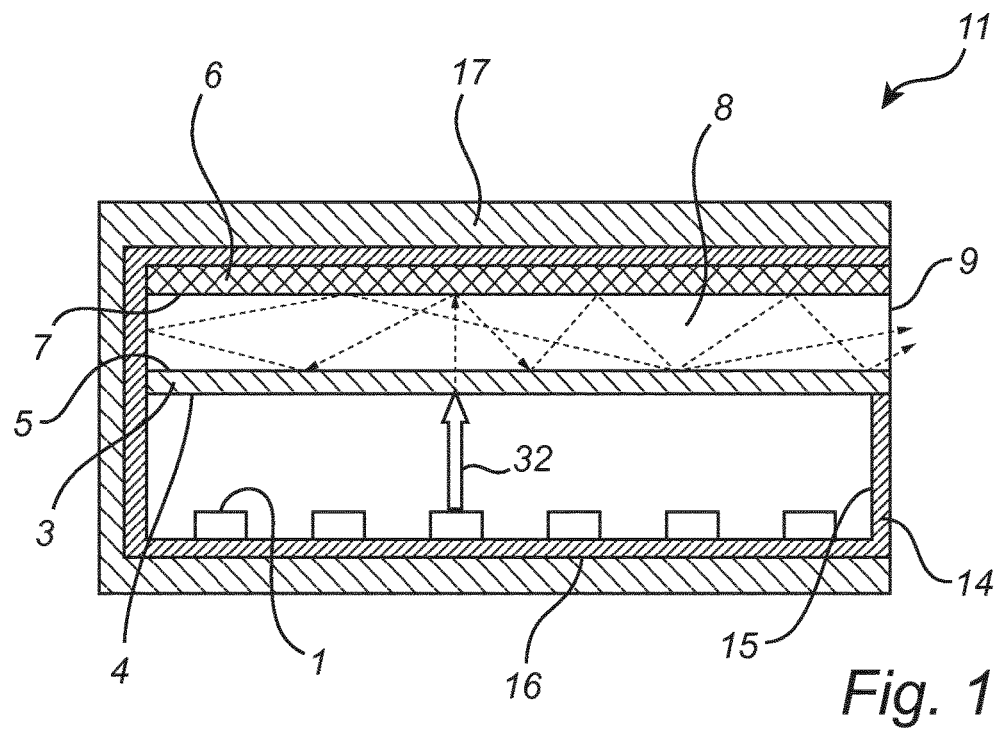
FIGS. 1-14 are schematic cross-sectional side views of light concentrators in accordance with exemplifying embodiments of the present invention.

All the figures are schematic, not necessarily to scale, and generally only show parts which are necessary in order to elucidate embodiments of the present invention, wherein other parts may be omitted or merely suggested.

DETAILED DESCRIPTION

The present invention will now be described hereinafter with reference to the accompanying drawings, in which exemplifying embodiments of the present invention are shown. The present invention may, however, be embodied in many different forms and should not be construed as limited to the embodiments set forth herein; rather, these embodiments are provided by way of example so that this disclosure will convey the scope of the invention to those skilled in the art.

FIGS. 1-14 are schematic cross-sectional side views of light concentrators 11 in accordance with exemplifying embodiments of the present invention. In FIGS. 1-14, identical reference numerals denote the same or similar components having a same or similar function, unless specifically stated otherwise.

With reference to FIG. 1, the light concentrator 11 comprises lighting elements 1, which each is configured to or capable of emitting light, possibly independently of each other. Light emitted by the lighting elements 1 is schematically indicated by reference numeral 32 in FIG. 1. Only one of the lighting elements 1 has been indicated in FIG. 1 by a reference numeral 1. At least one of the lighting elements 1 may include or be constituted by a solid state light emitter such as a LED, an OLED, and/or a laser diode. However, other types of light emitters may be utilized. Although the light concentrator 11 in the figures comprises several lighting elements 1, it is to be understood that the light concentrator 11 may include a single lighting element only. Further, the number of lighting elements 1 included in the light concentrator 11 illustrated in the figures is according to examples, and the light concentrator 11 could include more or fewer lighting elements 1 than what is illustrated in the figures.

The light concentrator 11 comprises an optical filter 3, which for example may include or be constituted by a multilayer reflector, a dichroic reflector, an optical notch filter and/or an interference filter. The optical filter 3 is arranged so as to receive light having a wavelength within a selected wavelength emission band via a light in-coupling surface 4.

The lighting elements 1 may be configured so as to emit light having a wavelength within the selected wavelength emission band. The lighting elements 1 may be configured to emit light having a full width at half maximum of less than about 30 nm, or less than about 20 nm, or less than about 10 nm, or less than about 5 nm. The lighting elements 1 may for example include or be constituted by solid state light emitters, such as LEDs, OLEDs, or laser diodes. The lighting elements 1 may be 'binned' so that the distance between the maximum intensities of the spectral light peaks of the lighting elements 1 is not greater than about 10 nm, or not greater than about 5 nm, or not greater than about 2 nm.

The optical filter 3 is configured to selectively transmit light incident on the light in-coupling surface 4 through the optical filter 3, and output the light via a light out-coupling surface 5, on a condition that the light incident on the light in-coupling surface 4 has a wavelength within a selected wavelength transmission band. The optical filter 3 is configured such that characteristics of the wavelength transmission band depend at least in part on the angle of incidence of light incident on the light in-coupling surface 3. The optical filter 3 is configured such that the wavelength transmission band for a selected angle or angles of incidence of light incident on the light in-coupling surface 4 at least in part overlaps with the wavelength emission band. Thereby, light incident on the light in-coupling surface 4 with an angle of incidence equal to or within the selected angle or angles of incidence of light may be transmitted through the optical filter 3.

The light concentrator 11 comprises a light-redirection element 6. The light-redirection element 6 has a light-redirection surface 7 which is arranged in relation to the light out-coupling surface 5 so as to receive at least some of the light out-coupled via the light out-coupling surface 5 (the light being indicated by the dashed arrows in FIG. 1). The light-redirection element 6, or the light-redirection surface 7, is configured to redirect light impinging on the light-redirection surface 7. Different configurations or implementations of the light-redirection element 6 are possible either alone or in any combination. The light-redirection element 6 may be realized for example as a layer or a coating. The light-redirection element 6 will be described further below with reference to the other figures.

The light concentrator 11 comprises a light-guiding region 8. The light-guiding region 8 is delimited at least by the light-redirection surface 7 and the light out-coupling surface 5. The light-guiding region 8 facilitates guiding of light which has been out-coupled via the light out-coupling surface 5 (the light being indicated by the dashed arrows in FIG. 1) towards a light-exiting region 9, via which light-exiting region 9 light may leave the light concentrator 11. The light-guiding region 8 will be described further below with reference to the other figures.

Figure 2:
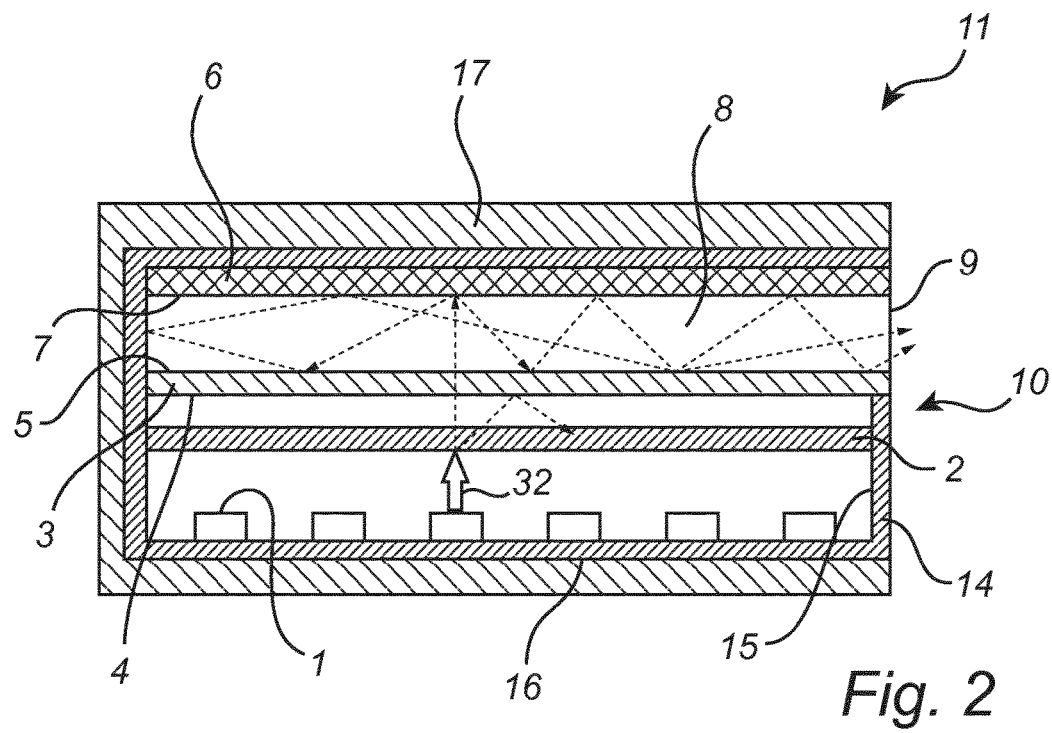

With reference to FIG. 2, the light concentrator 11 comprises an arrangement, schematically indicated in FIG. 2 by the reference numeral 10, which comprises lighting elements 1, which each is configured to or capable of emitting light, possibly independently of each other. Light emitted by the lighting elements 1 is schematically indicated by reference numeral 32 in FIG. 2. Only one of the lighting elements 1 has been indicated in FIG. 2 by a reference numeral 1. At least one of the lighting elements 1 may include or be constituted by a solid state light emitter such as a LED, an OLED, and/or a laser diode. However, other types of light emitters may be utilized.

Although the arrangement 10 or the light concentrator 11 in the figures comprises several lighting elements 1, it is to be understood that the arrangement 10 or light concentrator 11 may include a single lighting element only. Further, the number of lighting elements 1 included in the arrangement 10 or light concentrator 11 illustrated in the figures is according to examples, and the arrangement 10 or light concentrator 11 could include more or fewer lighting elements 1 than what is illustrated in the figures.

The arrangement 10 comprises a wavelength-selective element 2 which is arranged so as to receive or absorb at least a portion of light having been emitted by the lighting elements 1. The wavelength-selective element 2 is configured to, in response to receiving or absorbing light emitted by the lighting elements 1, output light having a wavelength within a selected wavelength emission band. Although FIG. 2 as well as FIGS. 3-14 illustrates use of a wavelength-selective element in the light concentrator 11, it is to be understood that a wavelength-selective element is optional and not required. Reference is made for example to the embodiment of the present invention described above with reference to FIG. 1.

The wavelength-selective element 2 may for example comprise luminescent material, which may be configured to absorb the at least a portion of light emitted by the lighting elements 1, and responsive thereto (i.e. responsive to receiving or absorbing light) output or emit light having a wavelength within the selected wavelength emission band. The luminescent material may for example comprise at least one element selected from the group of quantum confinement structures, lanthanide complexes, rare earth metal elements and phosphors.

Different arrangements of the plurality of lighting elements 1 relatively to the wavelength-selective element 2 are possible, as indicated in FIGS. 6-9.

Figure 6:
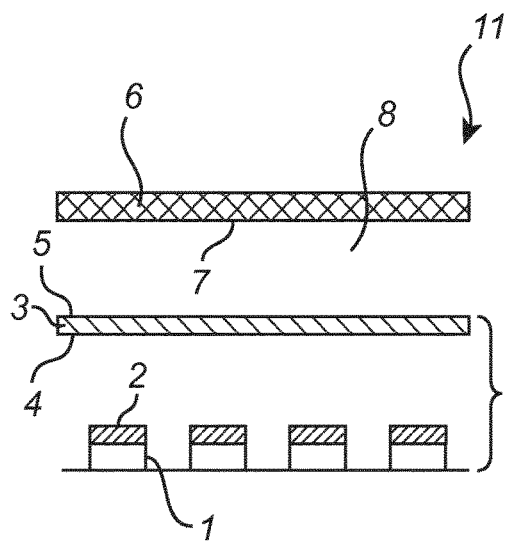

For example, the wavelength-selective element 2 may be arranged in a so called proximity mode or configuration with respect to the lighting elements 1, e.g. so as to cover or be positioned on the lighting elements 1, such as indicated in FIG. 6.

Figure 7:
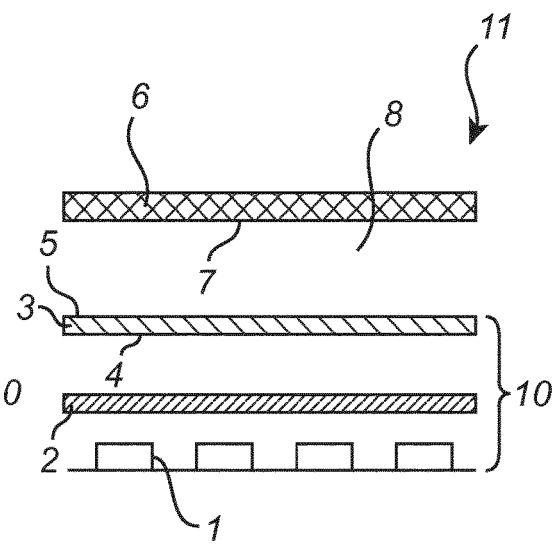

According to another example, the wavelength-selective element 2 may be arranged in a so called vicinity mode or configuration with respect to the lighting elements 1, at a distance from the lighting elements 1, such as indicated in FIG. 7. The distance, which may be bridged for example by some appropriate optical coupling or connection means, may for example be less than about 10 mm.

Figure 8:
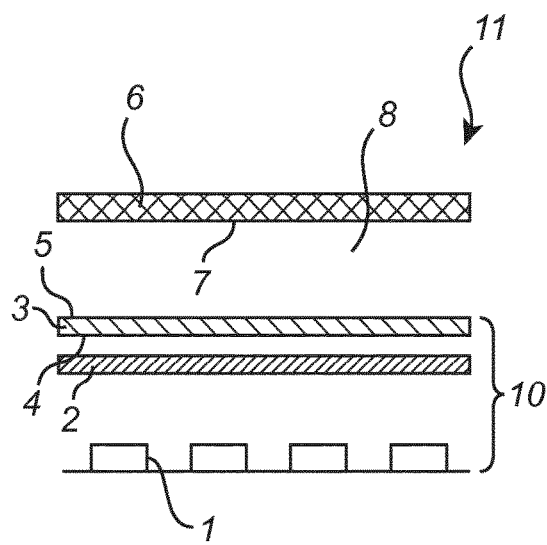

According to another example, the wavelength-selective element 2 may be arranged in so called remote mode or configuration with respect to the lighting elements 1, at a relatively large distance from the lighting elements 1, such as indicated in FIG. 8. For the example embodiment illustrated in FIG. 8, the distance may for example be between about 1 cm and 10 cm.

With further reference to FIG. 2, the arrangement 10 comprises an optical filter 3, which for example may include or be constituted by a multilayer reflector, a dichroic reflector, an optical notch filter and/or an interference filter. The optical filter 3 is arranged so as to receive at least a portion of light having been output by the wavelength-selective element 2 via a light in-coupling surface 4. The optical filter 3 is configured to selectively transmit light incident on the light in-coupling surface 4 through the optical filter 3, and output the light via a light out-coupling surface 5, on a condition that the light incident on the light in-coupling surface 4 has a wavelength within a selected wavelength transmission band.

The optical filter 3 is configured such that characteristics of the wavelength transmission band depend at least in part on the angle of incidence of light incident on the light in-coupling surface 3.

The optical filter 3 is configured such that the wavelength transmission band for a selected angle or angles of incidence of light incident on the light in-coupling surface 4 at least in part overlaps with the wavelength emission band. Thereby, light incident on the light in-coupling surface 4 with an angle of incidence equal to or within the selected angle or angles of incidence of light may be transmitted through the optical filter 3.

The concept of multilayer reflectors and dichroic reflectors as such is known in the art. For example, a multilayer reflector or a dichroic reflector may include a multilayer stack, with layers having alternating high and low refractive index. Multilayer reflectors or dichroic reflectors can be made such that its transmission wavelength band or reflection wavelength band in principle can have any position (e.g. defined by a center wavelength) and width, and such that the transmission characteristics may depend on the angle of incidence of light impinging on the multilayer reflector or dichroic reflector.

Figures 9, 10:
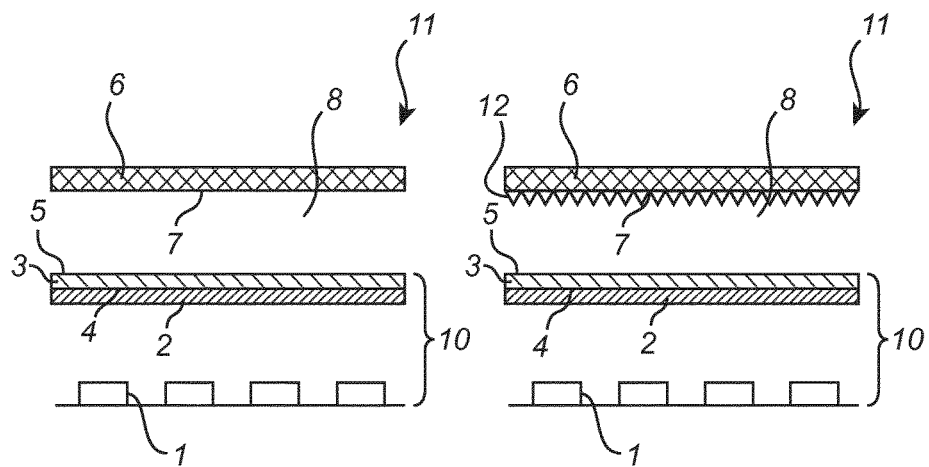

According to another example, which is illustrated in FIG. 9, the wavelength-selective element 2 may be arranged relatively close to the optical filter 3. For example, the wavelength-selective element 2 and the optical filter 3 may form a stack or layered structure, possibly with some intermediate component arranged or sandwiched there between.

The light concentrator 11 comprises a light-redirection element 6. The light-redirection element 6 has a light-redirection surface 7 which is arranged in relation to the light out-coupling surface 5 so as to receive at least some of the light out-coupled via the light out-coupling surface 5 (the light being indicated by the dashed arrows in FIG. 2). The light-redirection element 6, or the light-redirection surface 7, is configured to redirect light impinging on the light-redirection surface 7.

Different configurations or implementations of the light-redirection element 6 are possible either alone or in any combination. The light-redirection element 6 may be realized for example as a layer or a coating.

The light-redirection element 6 may for example comprise or be constituted by a reflective light-scattering element, e.g. a reflective light-scattering layer or coating, for example including $Al_2O_3$, $TiO_2$ and/or $BaSO_4$ particles. The light-redirection element 6, or the reflective light-scattering element, may be configured so as to be able to scatter light impinging on the light-redirection element 6 along a direction perpendicular to the light-redirection surface 7 to substantially all angles, and at least to most part specularly reflect light impinging on the light-redirection element 6 with a relatively small angle of incidence with respect to the light-redirection surface 7.

According to another example, the light-redirection element 6 may in alternative or in addition comprise or be constituted by a refractive element 12 (FIG. 10). The refractive element 12 may be coupled or connected to (directly or indirectly, e.g. via some intermediate optical coupling means) a specularly reflective element. As illustrated in FIG. 10, the refractive element 12 may be arranged so as to receive at least some of the light out-coupled via the light out-coupling surface 5. The refractive element 12 may be configured so as to be able to scatter light impinging on the refractive element 12 or light-redirection element 6 along a direction perpendicular to the light-redirection surface 7 to substantially all angles, and at least to most part specularly reflect light impinging on the refractive element 12 or light-redirection element 6 with a relatively small angle of incidence with respect to the light-redirection surface 7.

Figures 11, 12:
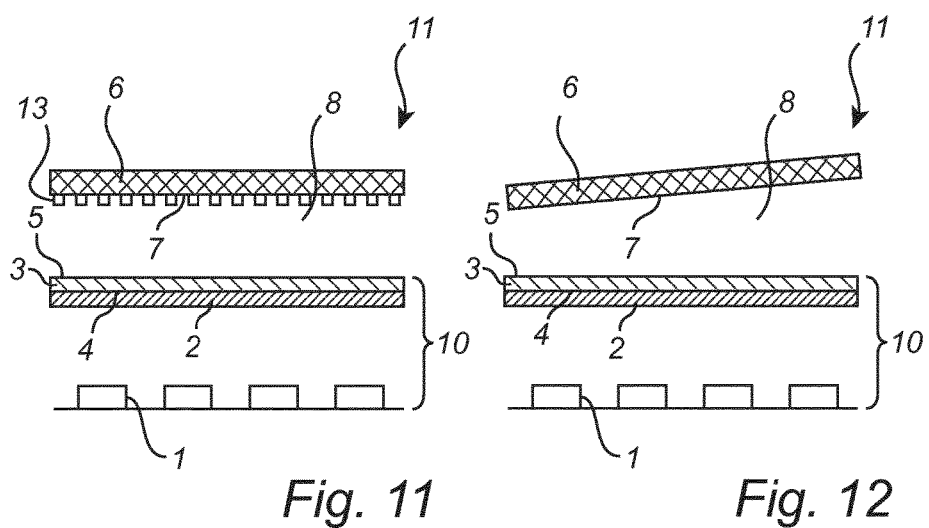

The light-redirection element 6 may according to an example in alternative or in addition comprise or be constituted by a diffractive element 13 (FIG. 11). The diffractive element 13 may be coupled or connected to (directly or indirectly, e.g. via some intermediate optical coupling means) a specularly reflective element. As illustrated in FIG. 11, the diffractive element 13 may arranged so as to receive at least some of the light out-coupled via the light out-coupling surface 5. The diffractive element 13 may for example comprise a photonic crystal structure which may be tailored so as to be able to reflect light having specific wavelength(s) at a larger reflection angle compared to light not having the specific wavelength(s).

According to another example, the light-redirection element 6 may in alternative or in addition according to an example comprise luminescent material, e.g. a layer or coating of luminescent material. The luminescent material may include inorganic, organic and/or quantum confinement structure material(s). The light-redirection element 6 may comprise a multi-layer reflector.

The light concentrator 11 comprises a light-guiding region 8. The light-guiding region 8 is delimited at least by the light-redirection surface 7 and the light out-coupling surface 5. The light-guiding region 8 facilitates guiding of light which has been out-coupled via the light out-coupling surface 5 (the light being indicated by the dashed arrows in FIG. 2) towards a light-exiting region 9, via which light-exiting region 9 light may leave the light concentrator 11. The light-exiting region 9 is in this example substantially perpendicular to the light out-coupling surface 5.

The light-guiding region 8 may for example include a light guide 8, which enables propagation of light coupled into it for example along its extension as schematically indicated for example in FIG. 1 or 2. The light-guiding region 8 or light guide 8 may be configured so as to facilitate or enable light to be guided or conveyed within the light-guiding region 8 or light guide 8 by means of undergoing multiple reflections within the light guide 8, such as, for example, by means of multiple reflections at an interface between the light-guiding region 8 or light guide 8 and its exterior, by means of TIR (total internal reflection). According to the embodiment depicted in FIG. 2, the light-exiting region 9 is constituted by a surface 9 arranged at an end of the light-guiding region 8 or light guide 8. However, the light concentrator 11 may include more than one light-exiting region 9. For example with reference to FIG. 3, the light concentrator 11 may comprise two light-exiting regions 9, in this example arranged opposite with respect to each other. The light-guiding region 8 or light guide 8 may for example be made of a polymeric material such as PMMA, PET, PC, silicone or a transparent glass. The light-guiding region 8 may according to another example include or be constituted by open void(s), filled with any gas, such as air, or substantially vacuum.

A portion of light impinging on the light-redirection surface 7 and which is redirected by the light-redirection surface 7 in a direction (substantially) towards the light-exiting region 9 may be reflected by the optical filter 3 during its propagation towards the light-exiting region 9. The optical filter 3 may hence be configured so as to allow for reflection of light impinging thereon, coming from within the light-guiding region 8, as indicated by the dashed arrows within the light-guiding region 8 as shown in FIG. 2 (and also in FIG. 1).

With reference to FIGS. 1-11, 13 and 14, the light-redirection surface 7 is parallel or substantially parallel with the light out-coupling surface 5. The wording substantially parallel in this respect indicates that the light-redirection surface 7 may be arranged at an angle to the light out-coupling surface 5, as is shown in FIG. 12. By arranging the light-redirection surface 7 at an angle with respect to the light out-coupling surface 5, or vice versa, propagating, guiding or conveying light guided in the light-guiding region 8 to the light-exiting region 9, may be facilitated such that the light may more easily escape from the light-guiding region 8. The angle may for example be chosen in a range in between 0 degrees and 20 degrees or between 0 degrees and 10 degrees.

Figure 5:
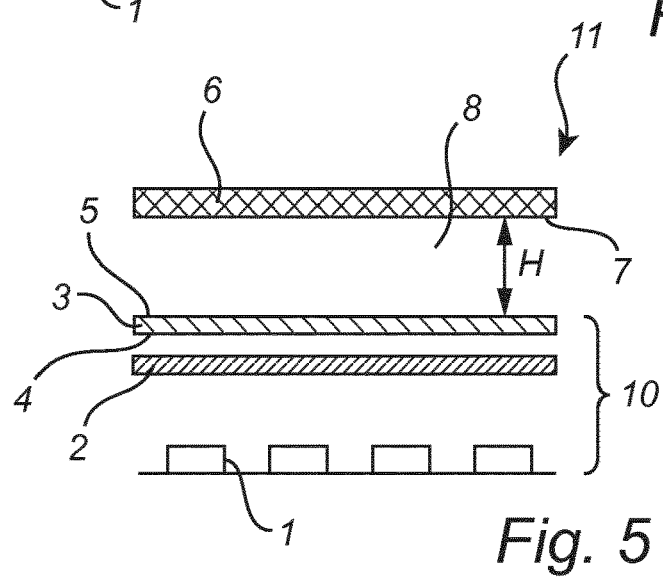

The light-guiding region 8 may in principle have any shape and any dimensions. For example with reference to FIGS. 4 and 5, which depict embodiments of the present invention which exhibit a planar geometry, the light-guiding region 8 may in principle have any length L (FIG. 4) and any height H (FIG. 5). According to examples, L may be between about 1 cm and 20 cm, or between about 3 cm and 6 cm, and H may be between about 0.1 cm and 3 cm, or between about 0.1 cm and 2 cm, or between about 0.1 cm and 0.5 cm. The light-guiding region 8 may in principle have any width W, i.e. in a direction perpendicular to the cross-section illustrated in FIGS. 1-14. W may be between about 0.1 cm and 1 cm, or between about 0.1 cm and 0.5 cm, or between about 0.1 cm and 0.3 cm.

It is to be noted that even though the wavelength-selective element 2, the optical filter 3 and the light-redirection element 6 in accordance with the embodiments depicted in the figures all exhibit a planar geometry or a layered structure, this is merely according to an example for illustrating embodiments of the present invention. It is contemplated that each of the wavelength-selective element 2, the optical filter 3 and the light-redirection element 6 in principle may exhibit any shape or geometrical configuration as desired or required in a particular application. For example, for the exemplifying case where the wavelength-selective element 2, the optical filter 3 and the light-redirection element 6 are plate-like, they are not required to be flat, but may be at least in part curved, possibly to different extent.

Figure 3:
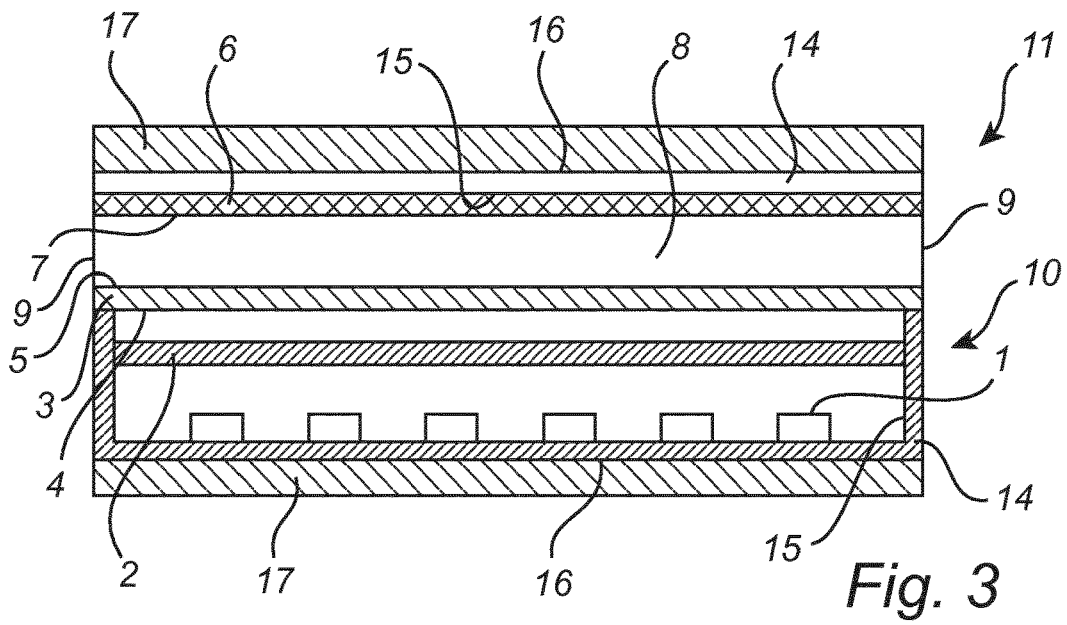
Figure 4:
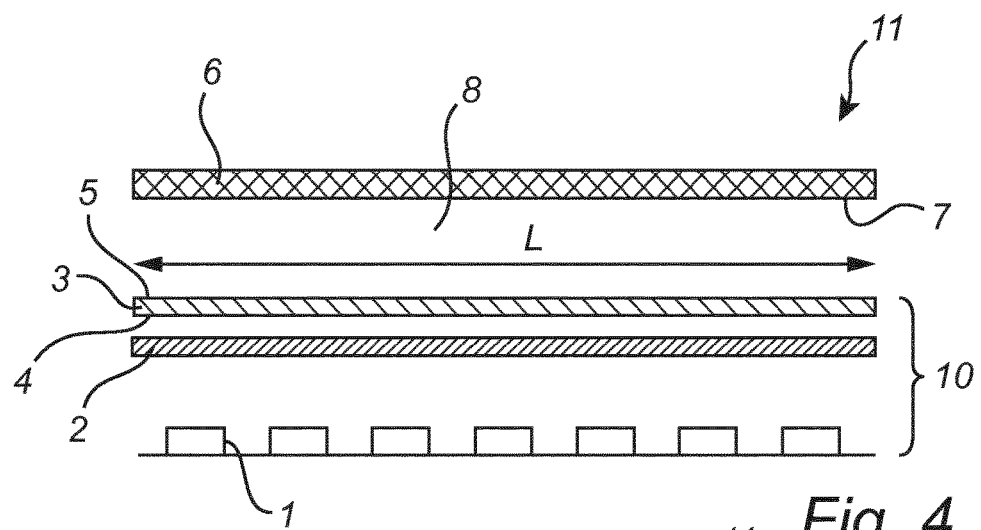

In accordance with the embodiments depicted in FIGS. 1, 2 and 3, the light concentrator 11 comprises a mixing chamber 14 which may have an inner surface 15 which is configured so as to be able to reflect light having been emitted by the lighting elements 1.

In accordance with the embodiments depicted in FIGS. 1, 2 and 3, the light concentrator 11 may comprise heat transferring means 17 configured to transfer heat generated by operation of the lighting elements 1 away from the light concentrator 11. The heat transferring means 17 may for example comprise a heat sink or a heat spreader or the like. As illustrated in FIGS. 1, 2 and 3, the heat transferring means 17 may be connected to an outer surface 16 of the mixing chamber 14.

It is to be understood that even though FIGS. 4-14 do not include a mixing chamber or heat transferring means, a mixing chamber and/or a heat transferring means may be included in any one of the light concentrators 11 illustrated in FIGS. 4-14, similarly to or such as illustrated in FIG. 1, 2 or 3.

The wavelength-selective element 2 may comprise a plurality of parts or portions, which possibly may exhibit different wavelength emission bands.

Figure 13:
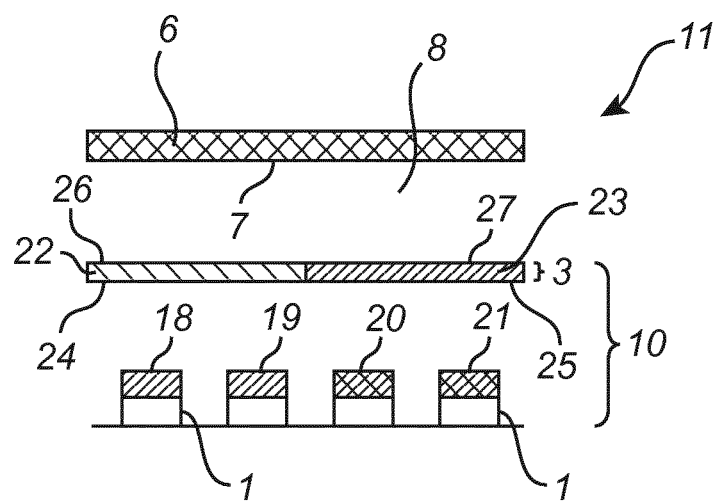

With reference to FIG. 13, the wavelength-selective element 2 may comprise four wavelength-selective portions 18-21 arranged so as to receive at least a portion of light emitted by the lighting elements 1. In accordance with the embodiment of the present invention illustrated in FIG. 13, each wavelength-selective portion 18-21 is arranged so as to receive light emitted by a corresponding lighting element 1, although this is not required. For example, wavelength-selective portions 18, 19 and wavelength-selective portions 20, 21 may be arranged so as to receive light emitted from two different lighting elements, respectively. Although in FIG. 13 the number of wavelength-selective portions 18-21 is four, this is according to an example only. In principle, any number of wavelength-selective portions is possible, e.g. one, two, three, five or six or more. The wavelength-selective portions 18-21 are configured to, responsive to receiving the light, output light having a wavelength within a selected, respective wavelength emission band.

The optical filter 3 may comprise a plurality of parts or portions. With further reference to FIG. 13, the optical filter 3 may comprise two portions 22, 23, each of the portions 22, 23 corresponding to a wavelength-selective portion 18-21. As illustrated in FIG. 13, each portion 22, 23 of the optical filter 3 is arranged so as to receive at least a portion of light output by a wavelength-selective portion 18-21 via a light in-coupling surface 24, 25 and configured to selectively transmit light incident on the light in-coupling surface 24, 25 through the optical filter 3 and output the light via a light out-coupling surface 26, 27, on a condition that the light incident on the light in-coupling surface 24, 25 has a wavelength within a selected, respective wavelength transmission band.

The light concentrator 11 may include several light-guiding regions, from each of which there may be realized or achieved a relatively high intensity of light leaving the light concentrator 11, possibly while preserving or substantially preserving the etendue at the light-exiting region 9 with respect to the light output from the optical filter.

Figure 14:
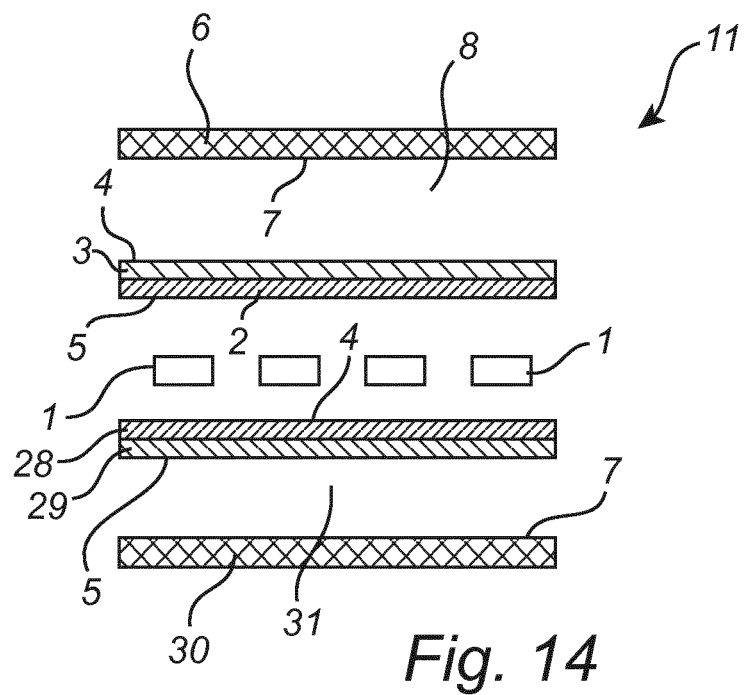

For example in accordance with the embodiment of the present invention illustrated in FIG. 14, the arrangement 10 may comprise two wavelength-selective elements 2, 28 and two optical filters 3, 29. Each of the optical filters 3, 29 correspond to one of the wavelength-selective elements 2, 28. For example, as indicated in FIG. 13, the optical filter 3 corresponds to the wavelength-selective element 2, and the optical filter 29 corresponds to the wavelength-selective element 28. Each of the optical filters 3, 29 and the corresponding one of the wavelength-selective elements 2, 28 may be arranged and configured so as to operate in conjunction with each other such as described above, e.g. as described above with reference to FIG. 2 or FIG. 3. The light concentrator 11 includes two light-redirection elements 6, 30. Each of light-redirection elements 6, 30 correspond to one of the optical filters 3, 29. For example, as indicated in FIG. 13, the light-redirection element 6 corresponds to the optical filter 3, and the light-redirection element 30 corresponds to the optical filter 29. Each of the light-redirection elements 6, 30 has a light-redirection surface 7 arranged in relation to the light out-coupling surface 5 of the corresponding optical filter 3, 29 so as to receive at least some of the light out-coupled via the light out-coupling surface 5 of the corresponding optical filter 3, 29, and configured to redirect light impinging on the light-redirection surface 7. Thereby, the light concentrator 11 comprises two light-guiding regions 8, 31, each of which is delimited at least by the light-redirection surface 7 of the corresponding light-redirection element 6, 30 and the light out-coupling surface 5 of the corresponding optical filter 3, 29.

It is to be understood that the arrangement 10 may comprise more than two wavelength-selective elements and more than two optical filters, and that the light concentrator 11 may comprise more than two light-redirection elements, in accordance with the same or similar principles as described above with reference to FIG. 14. Hence, the light concentrator 11 may comprise more than two light-guiding regions.

It is to be understood that the figures are schematic and in general only depict parts or portions which are useful for understanding principles of embodiments of the present invention, wherein other parts or portions may be omitted or merely suggested. For example, the light concentrator 11 may comprise components such as wiring, driving circuitry, a power source, etc. for powering and/or operation of the lighting elements 1. According to another example, the light concentrator 11 may comprise optical coupling members or elements for optically coupling or connecting together components, for example for optically coupling or connecting the light-guiding region 8 or light guide 8 to the light-redirection element 6 and to the optical filter 3, respectively. Such components are however not depicted in the figures.

In conclusion, there is disclosed a light concentrator which comprises an optical filter arranged so as to receive light having a wavelength within a selected wavelength emission band and configured to selectively transmit light through the optical filter and output the light on a condition that the light incident on optical filter has a wavelength within a selected wavelength transmission band. The optical filter is configured such that the wavelength transmission band for a selected angle or angles of incidence of light incident on the optical filter at least in part overlaps with the wavelength emission band, whereby light incident on the optical filter with the selected angle or angles of incidence equal to or within selected angle or angles of incidence of light may be transmitted through the optical filter. The optical filter may include a multilayer reflector and/or a dichroic reflector. The light concentrator may comprise a light-guiding region, which is delimited at least by a light-redirection surface and a light out-coupling surface of the optical filter, for guiding light out-coupled from the optical filter towards at least one light-exiting region, via which light may leave the light concentrator. A lighting device including such a light concentrator is also disclosed.

While the present invention has been illustrated in the appended drawings and the foregoing description, such illustration is to be considered illustrative or exemplifying and not restrictive; the present invention is not limited to the disclosed embodiments. Other variations to the disclosed embodiments can be understood and effected by those skilled in the art in practicing the claimed invention, from a study of the drawings, the disclosure, and the appended claims. In the appended claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A light concentrator comprising:
    at least one lighting element configured to emit light;
    an optical filter arranged so as to receive light having a wavelength within a selected wavelength emission band via a light in-coupling surface and configured to selectively transmit light incident on the light in-coupling surface through the optical filter and output the light via a light out-coupling surface, on a condition that the light incident on the light in-coupling surface has a wavelength within a selected wavelength transmission band;
    a light-redirection element having a light-redirection surface arranged substantially parallel in relation to the light out-coupling surface of the optical filter so as to receive at least some of the light out-coupled via the light out-coupling surface, and configured to redirect light impinging on the light-redirection surface;
    a light-guiding region, which is delimited at least by the light-redirection surface and the light out-coupling surface of the optical filter, for guiding light out-coupled via the light out-coupling surface towards at least one light-exiting region arranged substantially perpendicular to the light out-coupling surface and via which light may leave the light concentrator; and
    a wavelength-selective element arranged so as to receive at least a portion of light having been emitted by the at least one lighting element and configured to, responsive thereto, output light having a wavelength within the selected wavelength emission band, wherein the optical filter is arranged so as to receive at least a portion of light having been output by the wavelength-selective element, wherein the wavelength-selective element comprises luminescent material and the wavelength-selective element is configured such that light output by the wavelength-selective element has a full width at half maximum of less than 30 nm;

wherein the optical filter is configured such that characteristics of the wavelength transmission band depend at least in part on the angle of incidence of light incident on the light in-coupling surface, and wherein the optical filter is configured such that the wavelength transmission band for a selected angle or angles of incidence of light incident on the light in-coupling surface at least in part overlaps with the wavelength emission band, whereby light incident on the light in-coupling surface with an angle of incidence equal to or within the selected angle or angles of incidence of light is transmitted through the optical filter.

2. A light concentrator according to a claim 1, wherein the light out-coupling surface of the optical filter is configured to allow for reflection of light impinging thereon.

3. A light concentrator according to a claim 1, wherein the optical filter comprises a multilayer reflector and/or a dichroic reflector.

4. A light concentrator according to claim 1, wherein the luminescent material comprises at least one element selected from the group of quantum confinement structures, lanthanide complexes, rare earth metal elements and phosphors.

5. A light concentrator according to claim 1, wherein the wavelength-selective element is arranged at a distance from the at least one lighting element.

6. A light concentrator according to claim 1, wherein the at least one lighting element is configured to emit light having a full width at half maximum of less than about 20 nm.

7. A light concentrator according to claim 6, wherein the at least one lighting element includes at least one of an inorganic light-emitting diode, LED, an organic LED, OLED, and a laser.

8. A light concentrator according to claim 1, wherein the optical filter is configured such that the wavelength transmission band for a selected angle or angles of incidence of light incident on the light in-coupling surface at least in part overlaps with the wavelength emission band, whereby light incident on the light in-coupling surface with an angle of incidence equal to or within the selected angle or angles of incidence of light is transmitted through the optical filter, such that light output via the light out-coupling surface is output at an angle with respect to a direction perpendicular to the light out-coupling surface.

9. A light concentrator according to claim 1, wherein:
the wavelength-selective element comprises a plurality of wavelength-selective portions arranged so as to receive at least a portion of light emitted by the at least one lighting element and configured to, responsive thereto, output light having a wavelength within a selected, respective wavelength emission band; and
the optical filter comprises a plurality of portions, each of the portions of the optical filter corresponding to a wavelength-selective portion, wherein each portion of the optical filter is arranged so as to receive at least a portion of light output by a wavelength-selective portion via a light in-coupling surface and configured to selectively transmit light incident on the light in-coupling surface through the optical filter and output the light via a light out-coupling surface, on a condition that the light incident on the light in-coupling surface has a wavelength within a selected, respective wavelength transmission band.

10. A light concentrator according to claim 1, comprising a plurality of wavelength-selective elements and a plurality of optical filters, each of the plurality of optical filters corresponding to one of the plurality of wavelength-selective elements, wherein each of the plurality of optical filters and the corresponding one of the plurality of wavelength-selective elements are arranged and configured so as to operate in conjunction with each other.

11. A light concentrator according to claim 10, comprising:
a plurality of light-redirection elements, each of the plurality of light-redirection elements corresponding to one of the plurality of optical filters, each of the plurality of light-redirection elements having a light-redirection surface arranged in relation to the light out-coupling surface of the corresponding optical filter so as to receive at least some of the light out-coupled via the light out-coupling surface of the corresponding optical filter, and configured to redirect light impinging on the light-redirection surface, wherein the light concentrator comprises a plurality of light-guiding regions, each of which is delimited at least by one of the plurality of light-redirection surfaces and the corresponding light out-coupling surface, for guiding light out-coupled via the light out-coupling surface towards at least one light-exiting region via which light may leave the light concentrator.

12. A light concentrator according to claim 1, wherein the light-redirection element comprises at least one of a reflective light-scattering element, luminescent material, a diffractive element or a refractive element.

13. A lighting device comprising at least one light concentrator according to claim 1.

* * * * *